United States Patent
Lin et al.

(10) Patent No.: US 11,205,261 B1
(45) Date of Patent: Dec. 21, 2021

(54) OBJECT APPEARANCE DETECTION SYSTEM WITH POSTURE DETECTION AND CONTROL METHOD THEREOF

(71) Applicant: NATIONAL TAIPEI UNIVERSITY OF TECHNOLOGY, Taipei (TW)

(72) Inventors: Hsien-I Lin, Taipei (TW); Yu-Che Huang, Taipei (TW); Fauzy Satrio Wibowo, Taipei (TW); Yuda Risma Wahyudi, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 46 days.

(21) Appl. No.: 16/907,184

(22) Filed: Jun. 20, 2020

(51) Int. Cl.
  *G06K 9/00* (2006.01)
  *G06T 7/00* (2017.01)
  (Continued)

(52) U.S. Cl.
  CPC .......... *G06T 7/0004* (2013.01); *B25J 9/0093* (2013.01); *G05B 19/4182* (2013.01);
  (Continued)

(58) Field of Classification Search
  CPC ... G06T 1/0014; G06T 7/0002; G06T 7/0004; G06T 7/70; G06T 7/97; G06T 2207/10024; G06T 2207/10152; G06T 2207/30108; G06T 2207/30112; G06T 2207/30164; G06K 9/00664; G06K 9/209; G06K 9/3208; G06K 9/3216; G06K 2209/19; B25J 9/0093; B25J 9/0096; B25J 9/1694; B25J 9/1697; G05B 19/41815; G05B 19/4182; G05B 19/4183; G05B 19/4189; G05B 2219/39102; G05B 2219/39104; G05B 2219/39106; G05B 2219/40554; G05B 2219/40555; G05B 2219/40564
  USPC ........ 382/100, 101, 103, 108, 110, 141–145, 382/149–153, 199, 203, 209, 215, 217, 382/287–289, 291, 325; 348/86–89, 94, 348/95, 125–128; 901/2, 6–8, 46, 47;
  (Continued)

(56) References Cited

U.S. PATENT DOCUMENTS 6,360,142 B1 * 3/2002 Miura .................... B25J 9/1682
  700/245
8,880,216 B2 * 11/2014 Izumi ................. G05B 19/4182
  700/228
(Continued)

*Primary Examiner* — Eric Rush
(74) *Attorney, Agent, or Firm* — Chih Feng Yeh; Huntington IP Consulting CO., Ltd.

(57) ABSTRACT

An object appearance detection system with posture detection and a control method thereof are provided. A controlling and computing device uses a first sensor and a second sensor to control a conveying production line, and controls a robotic arm to move an object to be detected to a posture detection position and a surface detection position. When the object to be detected is in the posture detection position, the controlling and computing device receives a posture detection image to perform posture detection on the object to be detected. When the object to be detected is in the surface detection position, the controlling and computing device controls the robotic arm to adjust the posture of the object to be detected according to the posture detection result and receives images from a remote imaging device and photographing devices to perform surface defect detection on the object to be detected.

8 Claims, 14 Drawing Sheets

(51) Int. Cl.
  *G06T 1/00*    (2006.01)
  *G06T 7/70*    (2017.01)
  *G05B 19/418*  (2006.01)
  *B25J 9/00*    (2006.01)

(52) U.S. Cl.
  CPC ...... *G05B 19/41815* (2013.01); *G06T 1/0014*
    (2013.01); *G06T 7/70* (2017.01); *G05B*
    *2219/39102* (2013.01); *G05B 2219/39104*
    (2013.01); *G06K 2209/19* (2013.01); *G06T*
    *2207/10024* (2013.01); *G06T 2207/10152*
    (2013.01); *G06T 2207/30108* (2013.01)

(58) Field of Classification Search
  USPC ...... 198/339.1, 340, 341.01, 341.05, 341.09,
    198/345.1, 373, 375, 376, 377.02, 377.03,
    198/377.05, 377.1, 379, 434; 700/95,
    700/110, 112, 114, 186, 192, 193, 195,
    700/213, 228–230, 245, 258, 259
  See application file for complete search history.

(56) References Cited

U.S. PATENT DOCUMENTS

| | | | | |
|---|---|---|---|---|
| 9,492,926 B2 * | 11/2016 | Mattern | ................. | B25J 9/0084 |
| 9,498,798 B2 * | 11/2016 | Hellenbrand | .......... | B65G 47/52 |
| 11,040,836 B1 * | 6/2021 | Klapperich | .......... | B65G 47/912 |

* cited by examiner

OBJECT APPEARANCE DETECTION SYSTEM WITH POSTURE DETECTION AND CONTROL METHOD THEREOF

BACKGROUND

1. Technical Field

The present invention relates to a detection system and a control method thereof. In particular, the invention pertains to an object appearance detection system with posture detection and a control method thereof, which can perform posture detection on an object to be detected and perform surface defect detection on the object to be detected.

2. Related Art

In the automatic manufacturing process, the automatic detection of products on the conveying production line is the key technology to maintain the quality of the products. After the surface image of the product is obtained through the image capture technology, the computing device is used to perform surface defect detection on the product according to the surface image, wherein the defects on the surface of the product can be like scratches, unevenness, etc. By performing surface defect detection on the product, it can reduce the detection time and detection cost of the product in the manufacturing process.

However, in the existing technology, the automatic detection of the product on the conveying production line is to set up an imaging device on the conveying production line to obtain the surface image of the product. Because the product continuously moves on the conveying production line during the automatic manufacturing process, the obtained surface image of the product is often a blurred image and there are spots on the surface image, which lead to misjudgments in the surface defect detection. Moreover, the surface image of the product obtained by the imaging device installed on the conveying production line usually only includes part of the surfaces of the product, and does not include all the surfaces of the product, so it is easy to cause a flaw in the surface defect detection.

In the existing technology, a robotic arm can be further used to move the product from the conveying production line to the surface detection position, then the surface defect detection is performed on the product. The product is in a static state when the product is in the surface detection position, so it can avoid the problems that the obtained surface image of the product is often a blurred image and there are spots on the surface image. However, in the process of the robotic arm moving the product from the conveying production line to the surface detection position, the placement state of the product on the conveying production line is not considered. The surface image obtained in the surface detection position, is affected by the placement state of the product on the conveying production line, so that the obtained surface image may only include part of the surface of the product rather than the full surface of the product or the obtained surface image may be an incorrect surface image due to the rotation of the product relative to the surface detection position, thereby causing a flaw in the surface defect detection.

In summary, it can be seen that there are problems that in the existing process of the automatic surface defect detection of the product, the posture detection is not performed to adjust the posture of the product, resulting in failure to obtain the surface images including full surfaces of the product, and the obtained the surface image may be an incorrect surface image due to the rotation of the product relative to the surface detection position, thereby causing a flaw in the surface defect detection. Therefore, it is necessary to propose an improved technical solution to solve this problem.

SUMMARY

In view of the prior art, there are problems that in the existing process of the automatic surface defect detection of the product, the posture detection is not performed to adjust the posture of the product, resulting in failure to obtain the surface images including full surfaces of the product, and the obtained the surface image may be an incorrect surface image due to the rotation of the product relative to the surface detection position, thereby causing a flaw in the surface defect detection. The present invention discloses an object appearance detection system with posture detection.

The object appearance detection system with posture detection disclosed in the present invention includes a conveying production line, a first fixing frame, a remote imaging device, a detection platform, a first sensor, a second sensor, a robotic arm, a posture detection imaging device, a posture detection board, a second fixing frame, a plurality of photographing devices, and a controlling and computing device.

The conveying production line includes an input end and an output end, and the object to be detected enters the conveying production line from the input end and exits the conveying production line from the output end.

The first fixing frame is disposed on the output end. The remote imaging device is disposed on the first fixing frame, and is used to capture a back image of the object to be detected in a surface detection position.

The detection platform has a first installation surface and a second installation surface, the first installation surface is in contact with and perpendicular to the second installation surface, and the second installation surface faces the conveying production line.

The first sensor is disposed adjacent to the input end and located on the edge of the first installation surface adjacent to the conveying production line. The first sensor is used to sense the object to be detected on the conveying production line.

The second sensor is spaced apart from the first sensor, disposed adjacent to the input end, and located on the edge of the first installation surface adjacent to the conveying production line. The second sensor is used to sense the object to be detected on the conveying production line.

The robotic arm is disposed adjacent to the output end, located on the first installation surface, and close to the conveying production line. The robotic arm is used to obtain the object to be detected from the conveyor production line to move the object to be detected to a posture detection position and a surface detection position.

The posture detection imaging device is disposed adjacent to the output end, located on the edge of the second installation surface, and close to the conveying production line. The posture detection imaging device is used to capture a posture detection image when the object to be detected moves to the posture detection position through the robotic arm.

The posture detection board is disposed vertically above the posture detection imaging device, and the posture detection board is used for posture detection of the object to be detected.

The second fixing frame is disposed on the first installation surface. The plurality of photographing devices is respectively disposed on the second fixing frame for capturing a front image, a left-side image, a right-side image, a top image and a bottom image of the object to be detected in the surface detection position respectively.

The controlling and computing device establishes connections with the conveying production line, the remote imaging device, the first sensor, the second sensor, the robotic arm, the posture detection imaging device, and the photographing devices respectively. The controlling and computing device is used to perform calculations on information received from the first sensor, the second sensor, and the posture detection imaging device to control the operation of the conveying production line and the robotic arm, and perform surface defect detection on the object to be detected based on the images received from the remote imaging device and the photographing devices.

The control method of the object appearance detection system with posture detection disclosed in the present invention includes the following steps.

First, the controlling and computing device calculates a moving speed of the conveying production line according to the time difference between the first sensor and the second sensor sensing the object to be detected. Next, the controlling and computing device controls and adjusts the moving speed of the conveying production line according to the calculated moving speed of the conveying production line. Then, the controlling and computing device calculates movement time of the object to be detected moving to a pick-and-place position according to a distance between the second sensor and the posture detection imaging device, and the controlled and adjusted moving speed of the conveying production line. Then, when the controlling and computing device confirms that the object to be detected is in a pick-and-place position based on the movement time, the controlling and computing device controls the conveying production line to pause in moving the object to be detected. Then, the controlling and computing device controls the robotic arm to obtain the object to be detected on the conveying production line and move the object to be detected to the posture detection position. Then, the controlling and computing device obtains the posture detection image from the posture detection imaging device. Then, the controlling and computing device calculates an offset and a rotation amount of the object to be detected based on the posture detection image. Then, the controlling and computing device controls the robotic arm to move the object to be detected from the posture detection position to the surface detection position according to the offset and the rotation amount of the object to be detected, wherein a centric position of the object to be detected is moved to a centric position of the surface detection position according to the offset of the object to be detected, and the object to be detected is rotated to be straightened according to the rotation amount of the object to be detected. Then, the controlling and computing device obtains the back image from the remote imaging device. Then, the controlling and computing device obtains the front image, the left-side image, the right-side image, the top image, and the bottom image from the photographing devices. Then, the controlling and computing device performs surface defect detection on the object to be detected based on the back image, the front image, the left-side image, the right-side image, the top side image, and the bottom side image. Then, the controlling and computing device controls the robotic arm to move the object to be detected from the surface detection position to the pick-and-place position on the conveying production line. Finally, the controlling and computing device controls the conveying production line to resume moving the object to be detected.

The object appearance detection system with posture detection and the control method thereof disclosed in the present invention are as above. The differences from the prior art are that the controlling and computing device establishes connections with the conveying production line, the remote imaging device, the first sensor, the second sensor, the robotic arm, the posture detection imaging device, and the photographing devices respectively; the controlling and computing device uses the first sensor and the second sensor to control the conveying production line, and controls the operation of the robotic arm to move the object to be detected on the conveying production line to the posture detection position and the surface detection position respectively; when the object to be detected is in the posture detection position, the controlling and computing device receives the posture detection image from the posture detection imaging device to perform posture detection on the object to be detected; and when the object to be detected is in the surface detection position, the controlling and computing device controls the robotic arm to adjust the posture of the object to be detected according to the posture detection result and receives images from the remote imaging device and the photographing devices to perform surface defect detection on the object to be detected.

By the above-mentioned technical solution, the present invention can achieve the technical effect of providing the posture detection and adjusting the posture of the object to be detected for the object appearance detection.

BRIEF DESCRIPTION OF THE DRAWINGS

The structure, operating principle and effects of the present invention will be described in detail by way of various embodiments which are illustrated in the accompanying drawings.

DETAILED DESCRIPTION

Figure 1:
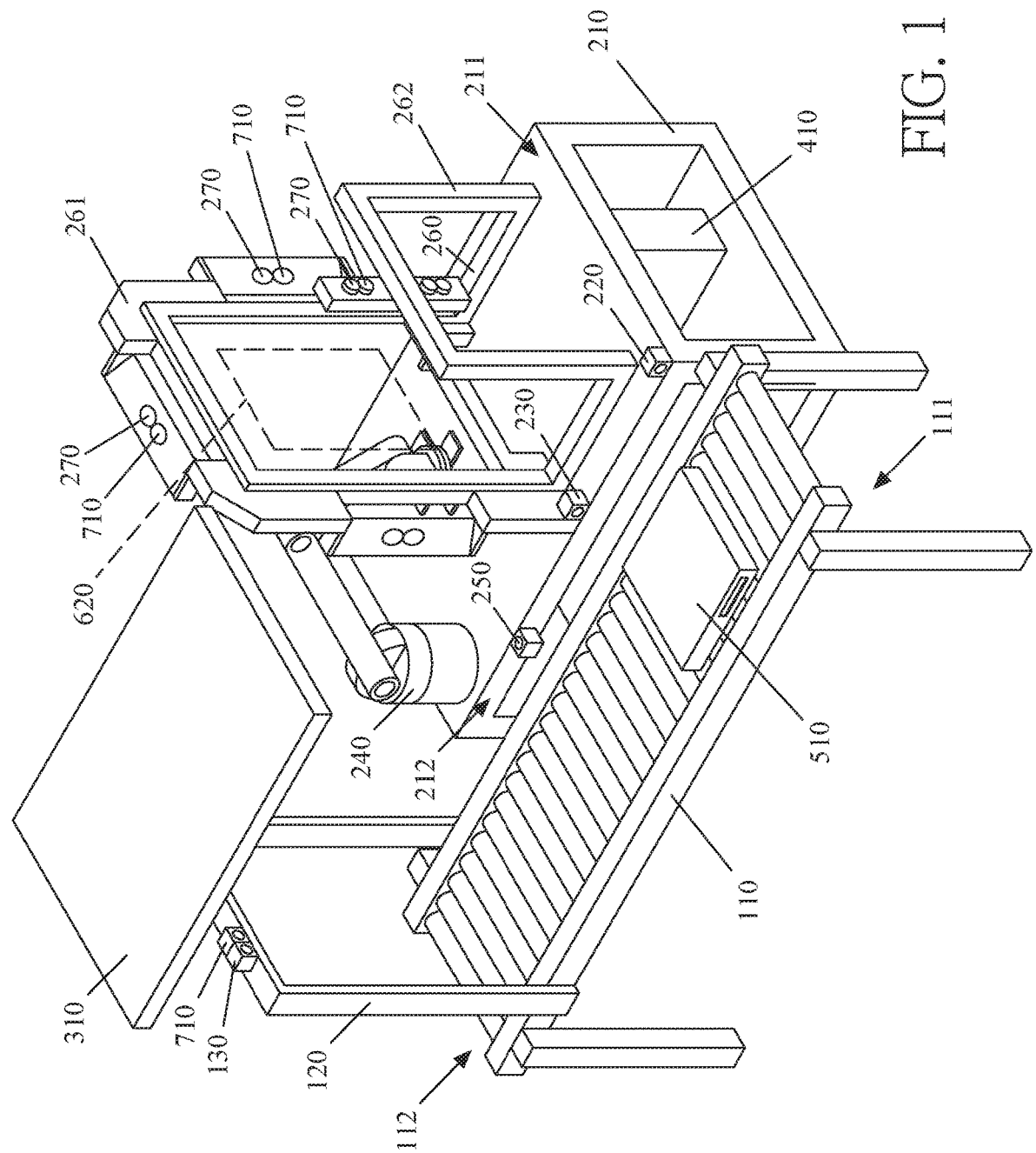
FIG. 1 is a three-dimensional view of an object appearance detection system with posture detection of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise", "include" and "have", and variations such as "comprises", "comprising", "includes", "including", "has" and "having" will be acknowledged to imply the inclusion of stated elements but not the exclusion of any other elements.

The following first describes an object appearance detection system with posture detection disclosed in the present invention, and please refer to FIG. 1, which is a three-dimensional view of an object appearance detection system with posture detection of the present invention.

The object appearance detection system with posture detection disclosed in the present invention includes a conveying production line 110, a first fixing frame 120, a remote imaging device 130, a detection platform 210, a first sensor 220, a second sensor 230, a robotic arm 240, a posture detection imaging device 250, a posture detection board 310, a second fixing frame 260, a plurality of photographing devices 270, and a controlling and computing device 410.

Figure 2:
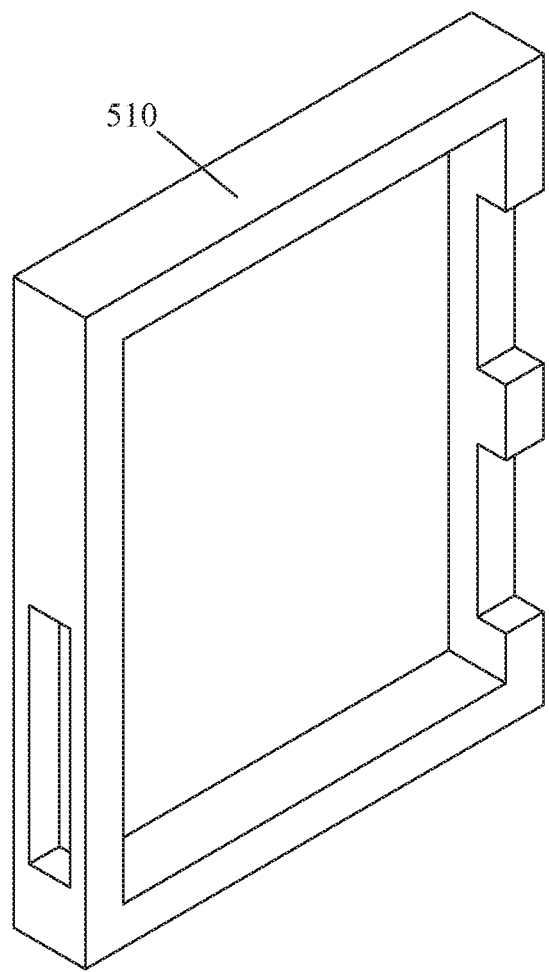
FIG. 2 is a three-dimensional view of the object to be detected of the object appearance detection system with posture detection of the present invention.

The conveying production line 110 includes an input end 111 and an output end 112. The object to be detected 510 enters the conveying production line 110 from the input end 111 of the conveying production line 110 and exits the conveying production line 110 from the output end 112 of the conveying production line 110. Please refer to FIG. 2, which is a three-dimensional view of the object to be detected of the object appearance detection system with posture detection of the present invention. The object to be detected 510 is a magnetic object, and the material of the magnetic object is, for example, iron, cobalt, nickel, etc., which are only examples here, and do not limit the application scope of the present invention.

Figure 3:
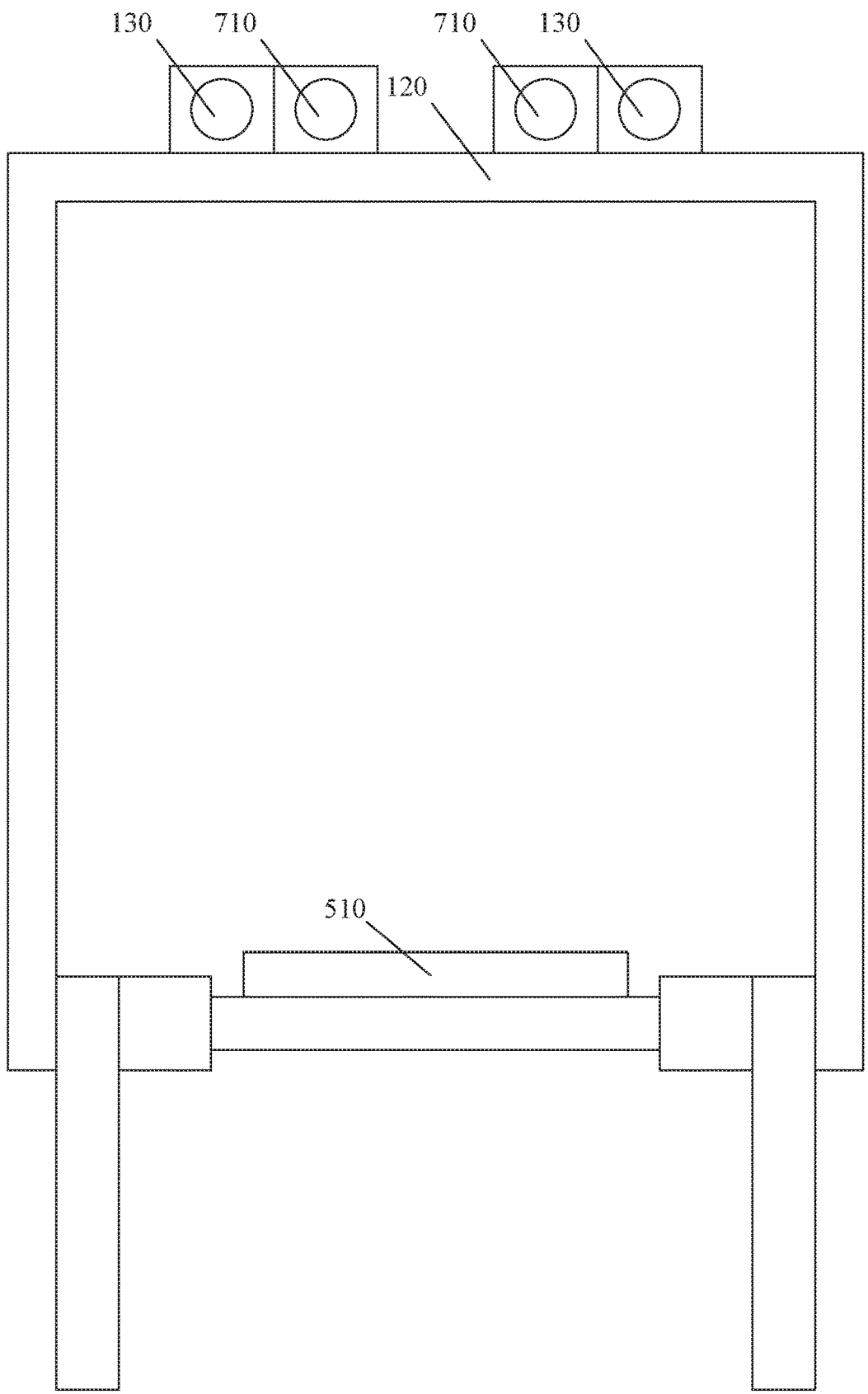
FIG. 3 is a plan view of the first fixing frame of the object appearance detection system with posture detection of the present invention.

The first fixing frame 120 is vertically disposed on the output end 112 of the conveying production line 110. The first fixing frame 120 is provided for setting up the remote imaging device 130, and the remote imaging device 130 can be used for capturing the back image of the object to be detected 510, which is disposed on the surface detection position 620. Please refer to FIG. 3, which is a plan view of the first fixing frame of the object appearance detection system with posture detection of the present invention. It is worth noting that an illumination device 710 may be further disposed beside the remote imaging device 130. The illumination device 710 is used to provide a light source for the remote imaging device 130 when the remote imaging device 130 captures the back image of the object to be detected 510, which is disposed in the surface detection position 620.

The detection platform 210 has a first installation surface 211 and a second installation surface 212, the first installation surface 211 of the detection platform 210 is connected to and perpendicular to the second installation surface 212 of the detection platform 210, and the second installation surface 212 of the detection platform 210 faces the conveying production line 110. There is a gap between the detection platform 210 and the conveying production line 110, and the gap is provided for the installation space of the posture detection imaging device 250.

The first sensor 220 is disposed adjacent to the input end 111 of the conveying production line 110, and located on the edge of the first mounting surface 211 of the detection platform 210 adjacent to the conveying production line 110. The first sensor 220 senses the object to be detected 510 on the conveying production line 110 in an infrared sensing manner, which is only an example here, and does not limit the application scope of the present invention.

The second sensor 230 is spaced apart from the first sensor 220, disposed adjacent to the input end 111 of the conveying production line 110, and located on the edge of the first mounting surface 211 of the detection platform 210 adjacent to the conveying production line 110. The first sensor 220 senses the object to be detected 510 before the second sensor 230 senses the object to be detected 510. The second sensor 230 also senses the object to be detected 510 on the conveying production line 110 in the infrared sensing manner, which is only an example here, and does not limit the application scope of the present invention.

Figure 4A:
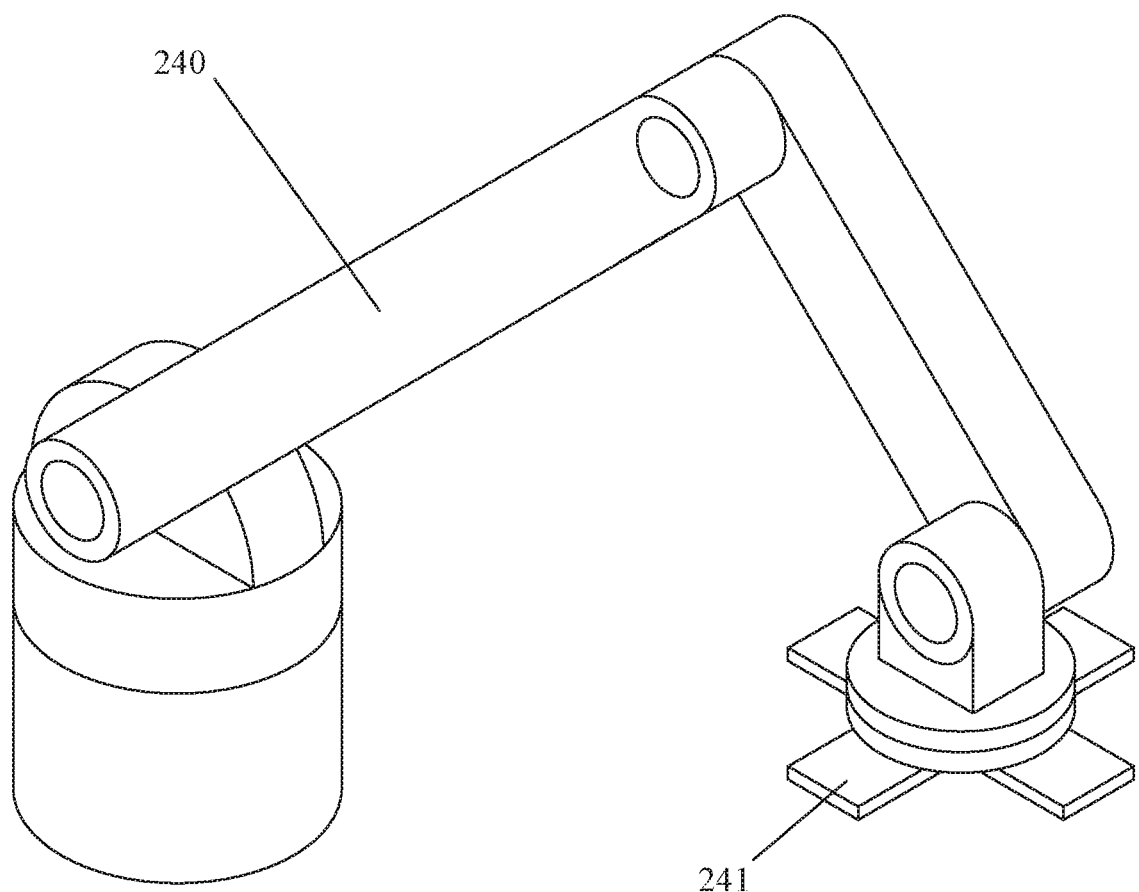
FIG. 4A is a three-dimensional view of the robotic arm of the object appearance detection system with posture detection of the present invention.
Figure 4B:
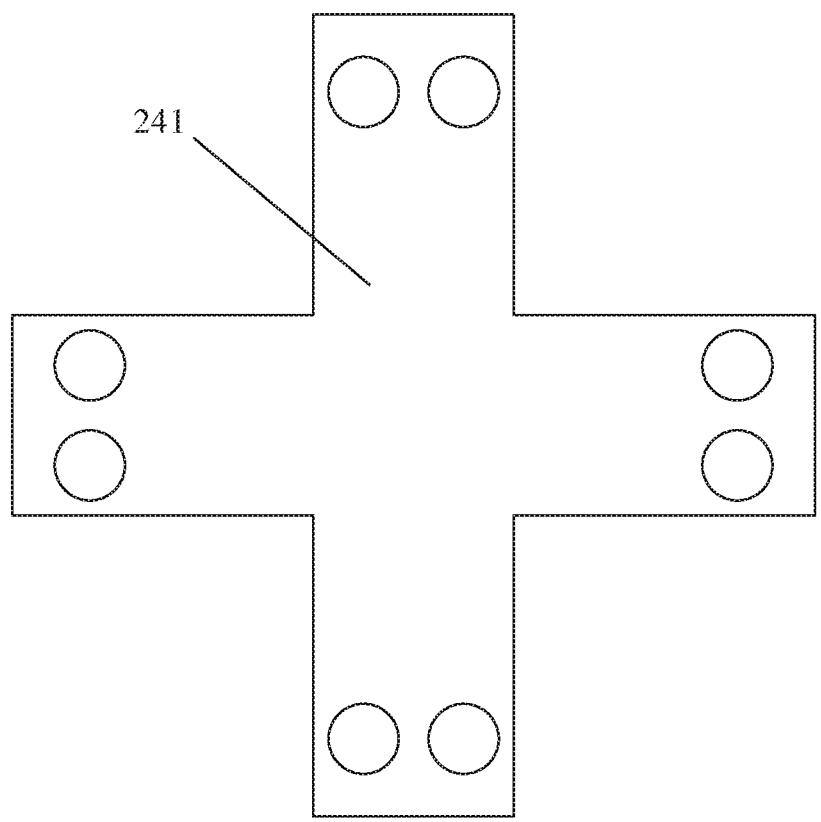
FIG. 4B is a plan view of the magnetic fixture of the object appearance detection system with posture detection of the present invention.

The robotic arm 240 is disposed adjacent to the output end 112 of the conveying production line 110, located on the first installation surface 211 of the detection platform 210, and close to the conveying production line 110. The robotic arm 240 is provided to obtain the object to be detected 510 on the conveying production line 110 to move the object to be detected 510 to the posture detection position 610 and the surface detection position 620. The robotic arm 240 is a six-degree-of-freedom robotic arm 240, and the robotic arm 240 uses a magnetic fixture 241 to obtain the object to be detected 510 on the conveying production line 110 by the magnetic attraction. Please refer to FIG. 4A and FIG. 4B, wherein FIG. 4A is a three-dimensional view of the robotic arm of the object appearance detection system with posture detection of the present invention, and FIG. 4B is a plan view of the magnetic fixture of the object appearance detection system with posture detection of the present invention.

Figure 5A:
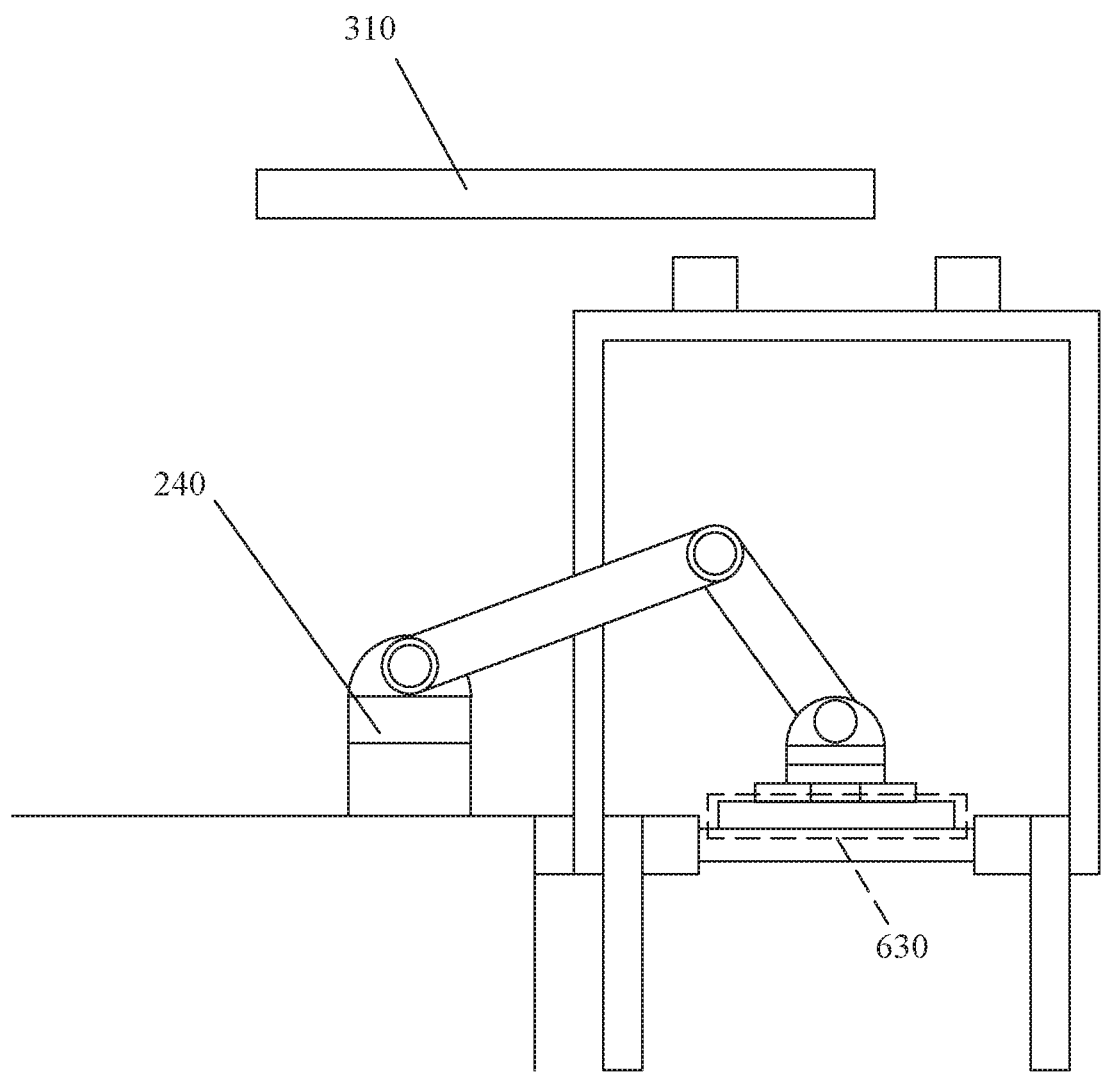
FIG. 5A is a plan view of the pick-and-place position of the object appearance detection system with posture detection of the present invention.
Figure 5B:
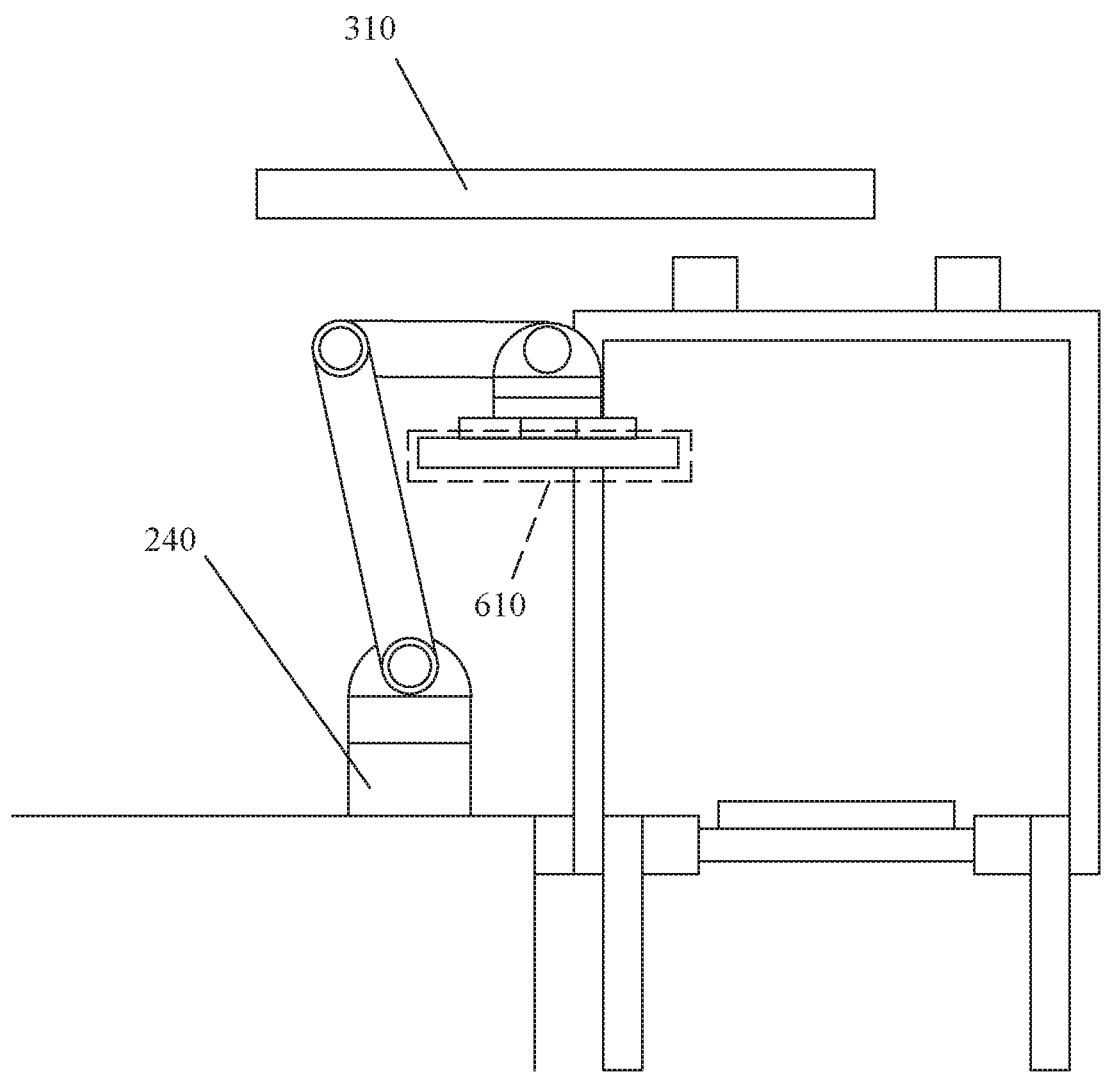
FIG. 5B is a plan view of the posture detection position of the object appearance detection system with posture detection of the present invention.

The posture detection imaging device 250 is disposed adjacent to the output end 112 of the conveying production line 110, and located on the edge of the second installation surface 212 of the detection platform 210 adjacent to the conveying production line 110. When the robotic arm 240 obtains the object to be detected 510 on the conveying production line 110 and moves the object to be detected 510 to the posture detection position 610, the posture detection imaging device 250 can capture the posture detection image. The posture detection position 610 is shown in FIG. 5B, which is a plan view of the posture detection position of the object appearance detection system with posture detection of the present invention.

Figure 6:
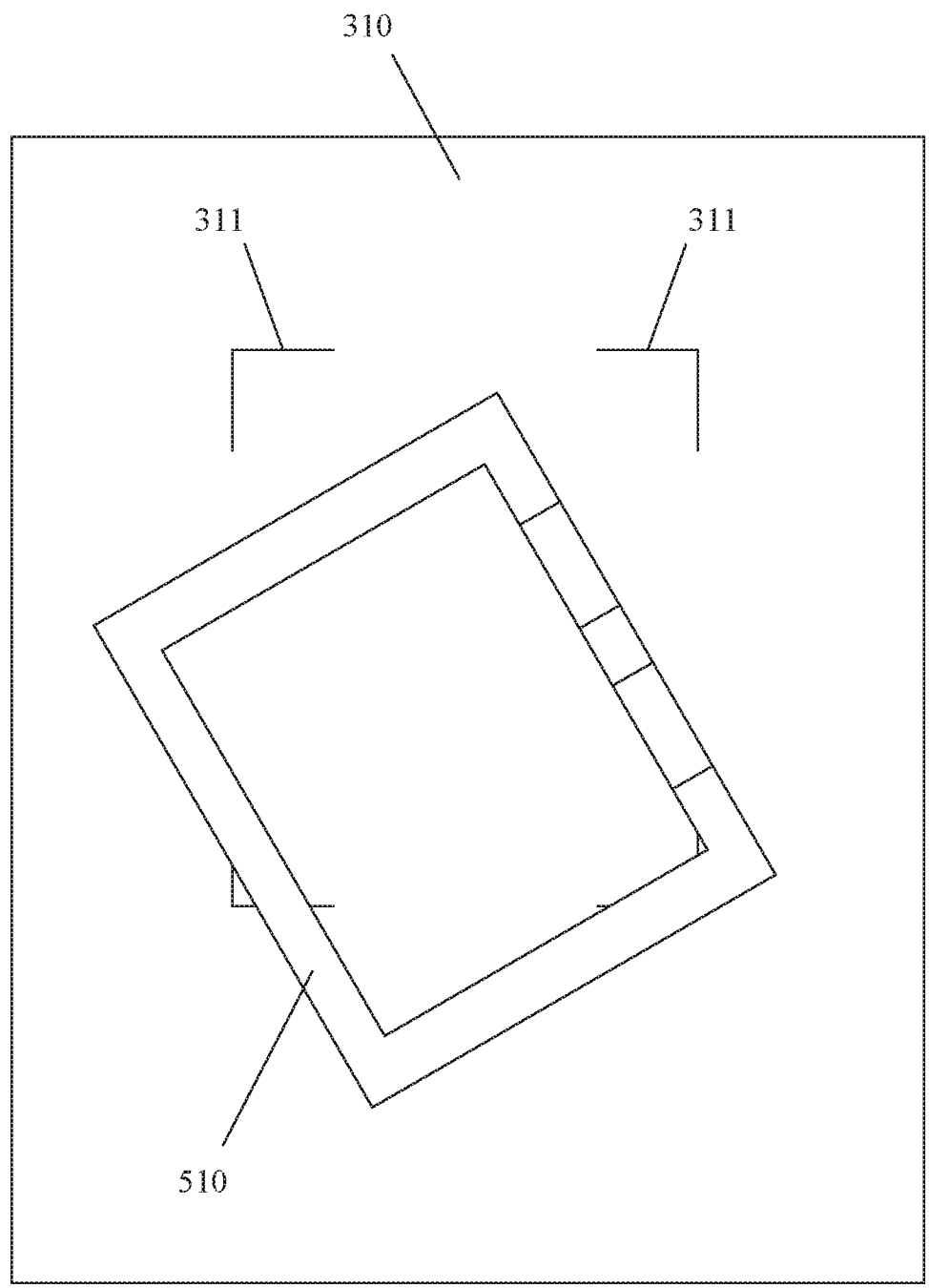
FIG. 6 is a plan view of the posture detection board of the object appearance detection system with posture detection of the present invention.

Please refer to FIG. 6, which is a plan view of the posture detection board of the object appearance detection system with posture detection of the present invention. The posture detection board 310 is vertically installed above the posture detection imaging device 250. The posture detection board 310 is provided for the posture detection of the object to be detected 510 through the positioning marks 311. The posture detection is to analyze and calculate the offset and the rotation amount of the object to be detected 510 relative to the positioning marks 311 on the posture detection board 310 when the object to be detected 510 is obtained by the robotic arm 240 and is moved to the posture detection position 610. The offset and the rotation amount of the object to be detected 510 relative to the positioning marks 311 on the posture detection board 310 can be used to solve the problems of the position deviation due to the failure of obtaining the centric position of the object to be detected 510 by the magnetic fixture 241 of the robotic arm 240, and the rotation deviation caused by the rotation of the object to be detected 510 relative to the pick-and-place position. The positioning marks 311 on the posture detection board 310 are shown in FIG. 6, which is only an illustration, and the invention is not limited thereto.

Figure 7A:
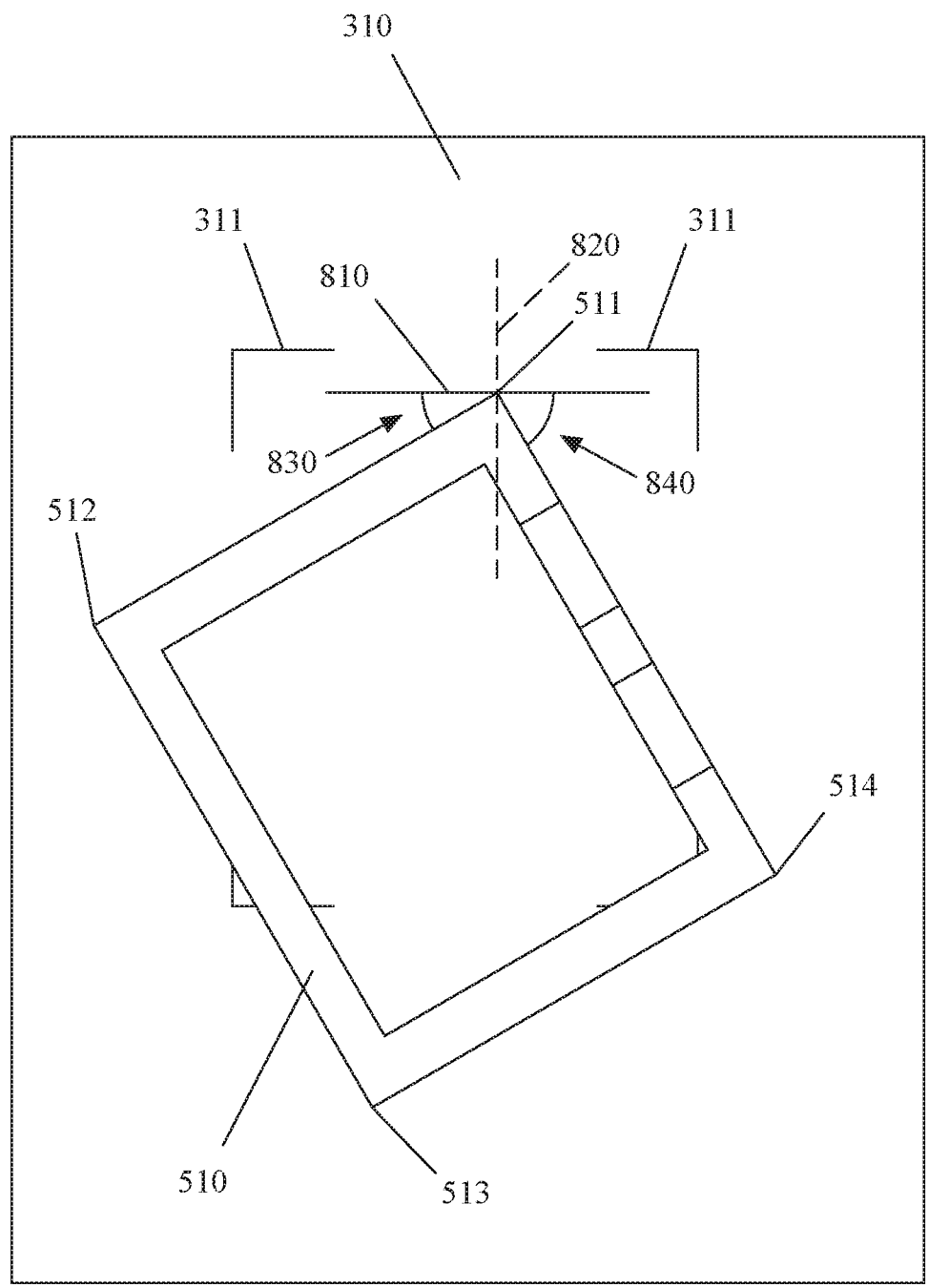
FIG. 7A is a schematic diagram of the rotation amount of the object appearance detection system with posture detection of the present invention.

The process of analyzing and calculating the offset and rotation amount of the object to be detected 510 relative to the positioning marks 311 on the posture detection board 310 is as follows. Please refer to FIG. 7A, which is a schematic diagram of the rotation amount of the object appearance detection system with posture detection of the present invention. First, the first corner point 511 of the object to be detected 510 is selected (in other embodiment, the second corner point 512, the third corner point 513, or the fourth corner point 514 also can be selected). Because the vertical line 820 drawn at the first corner point 511 of the object to be detected 510 can pass through the inside of the object to be detected 510, the vertical line 820 is not selected to be drawn at the first corner point 511 of the object to be detected 510, and a horizontal line 810 is drawn at the first corner point 511 of the object to be detected 510. There are a first angle 830 and a second angle 840 between the horizontal line 810 and the edges of the object to be detected 510 respectively. The first angle 830 which is smaller than the second angle 840 is selected. The object to be detected 510 needs to be rotated clockwise by the first angle 830 to straighten the object to be detected 510. The first angle 830 is the rotation amount of the object to be detected 510.

Figure 7B:
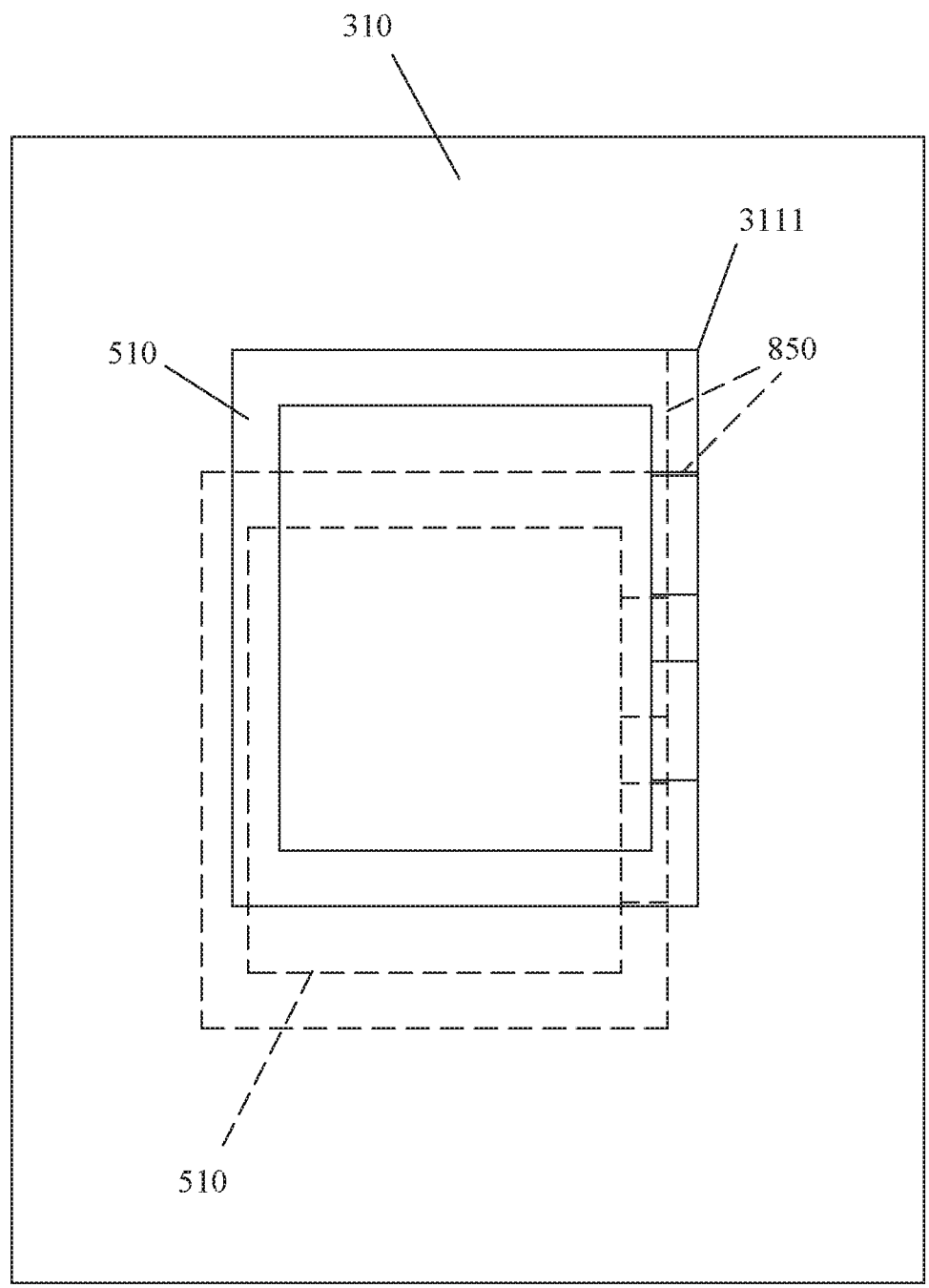
FIG. 7B is a schematic diagram of the offset of the object appearance detection system with posture detection of the present invention.

Please refer to FIG. 7B, which is a schematic diagram of the offset of the object appearance detection system with posture detection of the present invention. After the object to be detected 510 is straightened, the first corner point 511 of the object to be detected 510 moves horizontally and vertically to the first positioning sign 3111 closest to the posture detection board 310. The horizontal distance and vertical distance that the object to be detected 510 moves are the offset of 311 of the object to be detected 510 relative to the positioning marks 311.

The second fixing frame 260 is disposed on the first installation surface 211 of the detection platform 210. The second fixing frame 260 includes a first fixing portion 261 and a second fixing portion 262. A plurality of photographing devices 270 are disposed on the second fixing frame 260 respectively. In the embodiment, four photographing devices 270 are disposed on the first fixing portion 261 of the second fixing frame 260, and two photographing devices 270 are disposed on the second fixing portion 262 of the second fixing frame 260, which is just an example and does not limit the scope of application of the present invention. The photographing devices 270 can capture the front image, the left-side image, the right-side image, the top image and the bottom image of the object to be detected 510 in the surface detection position 620. It is worth noting that an illumination device 710 may be further disposed beside each photographing device 270. The illumination devices 710 are used to provide the light sources for the photographing devices 270 when the photographing devices 270 captures the front image, the left-side image, the right-side image, the top image and the bottom image of the object to be detected 510 disposed in the surface detection position 620.

The controlling and computing device 410 establishes connections with the conveying production line 110, the remote imaging device 130, the first sensor 220, the second sensor 230, the robotic arm 240, the posture detection imaging device 250, and the photographing devices 270 respectively. The controlling and computing device 410 performs calculations on the information received from the first sensor 220, the second sensor 230, and the posture detection imaging device 250 to control the operation of the conveying production line 110 and the robotic arm 240. The controlling and computing device 410 receives the images from the remote imaging device 130 and the photographing devices 270 to perform surface defect detection on the object to be detected 510. The calculation, control and surface defect detection performed by the controlling and computing device 410 are as follows.

The controlling and computing device 410 calculates the movement speed of the conveying production line 110 according to the time difference between the first sensor 220 and the second sensor 230 sensing the object to be detected 510. The controlling and computing device 410 can adjust and control the moving speed of the conveying production line 110 according to the calculated moving speed of the conveying production line 110.

The controlling and computing device 410 calculates the movement time of the object to be detected 510 moving to the pick-and-place position 630 according to the distance between the second sensor 220 and the posture detection imaging device 250 and the movement speed of the conveying production line 110, which is controlled and adjusted. When the controlling and computing device 410 confirms that the object to be detected 510 is in the pick-and-place position 630 based on the movement time, the controlling and computing device 410 controls the conveying production line 110 to pause in moving the object to be detected 510. Please refer to FIG. 5A, which is a plan view of the pick-and-place position of the object appearance detection system with posture detection of the present invention.

The controlling and computing device 410 controls the robotic arm 240 to obtain the object to be detected 510 on the conveying production line 110 and move the object to be detected 510 from the pick-and-place position 630 to the posture detection position 610. That is, there is a change on the position of the object to be detected 510 from FIG. 5A to FIG. 5B. The controlling and computing device 410 can obtain the posture detection image from the posture detection imaging device 250, and the controlling and computing device 410 can calculate the offset and the rotation amount of the object to be detected 510 according to the posture detection image. For the offset and the rotation amount of the object to be detected 510, please refer to the above description, which is not repeated here.

Figure 8A:
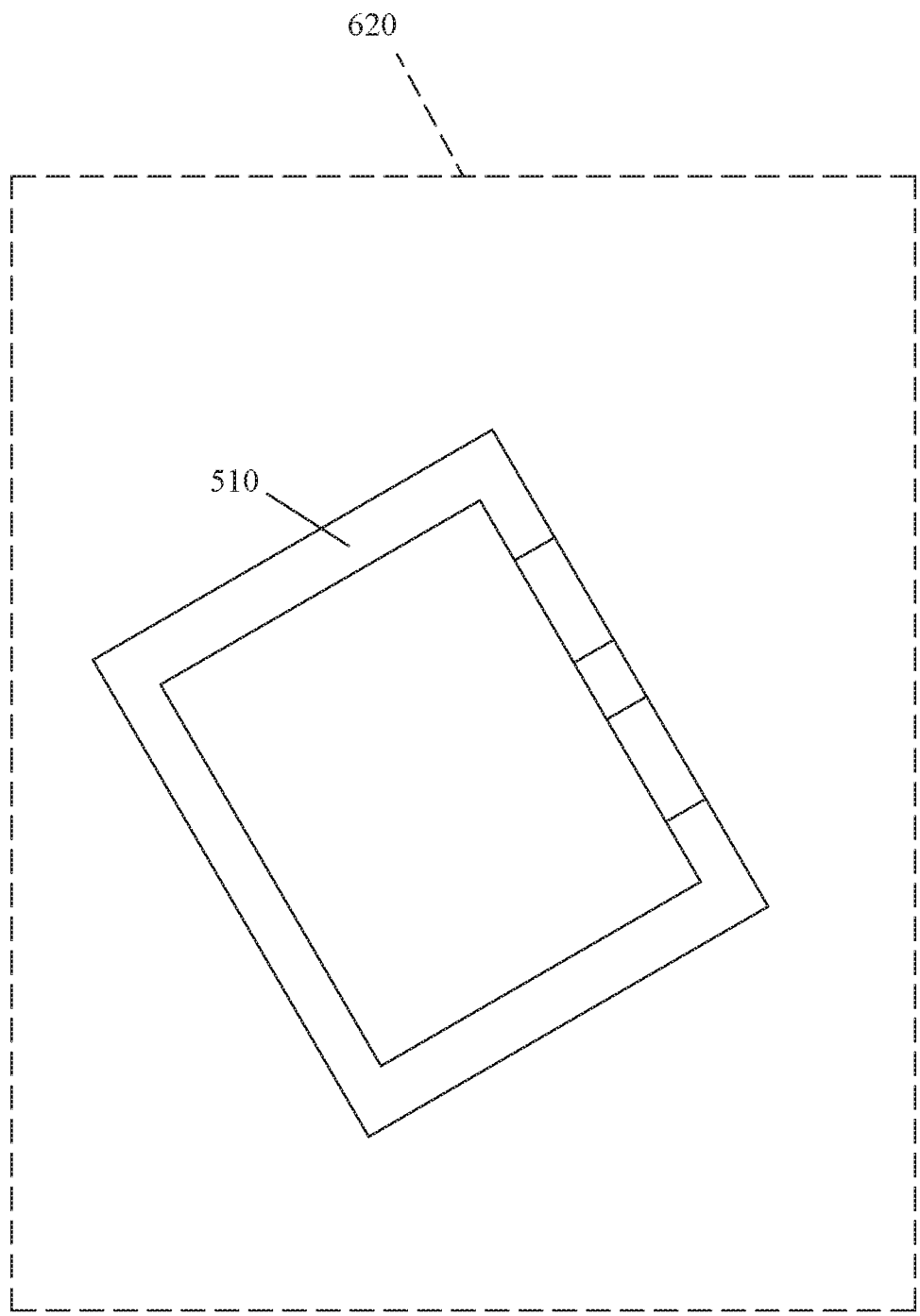
FIG. 8A is a schematic diagram of the presentation state of an object to be detected which is moved to the surface detection position without performing posture detection and adjusting the posture according to the object appearance detection system with posture detection of the present invention.
Figure 8B:
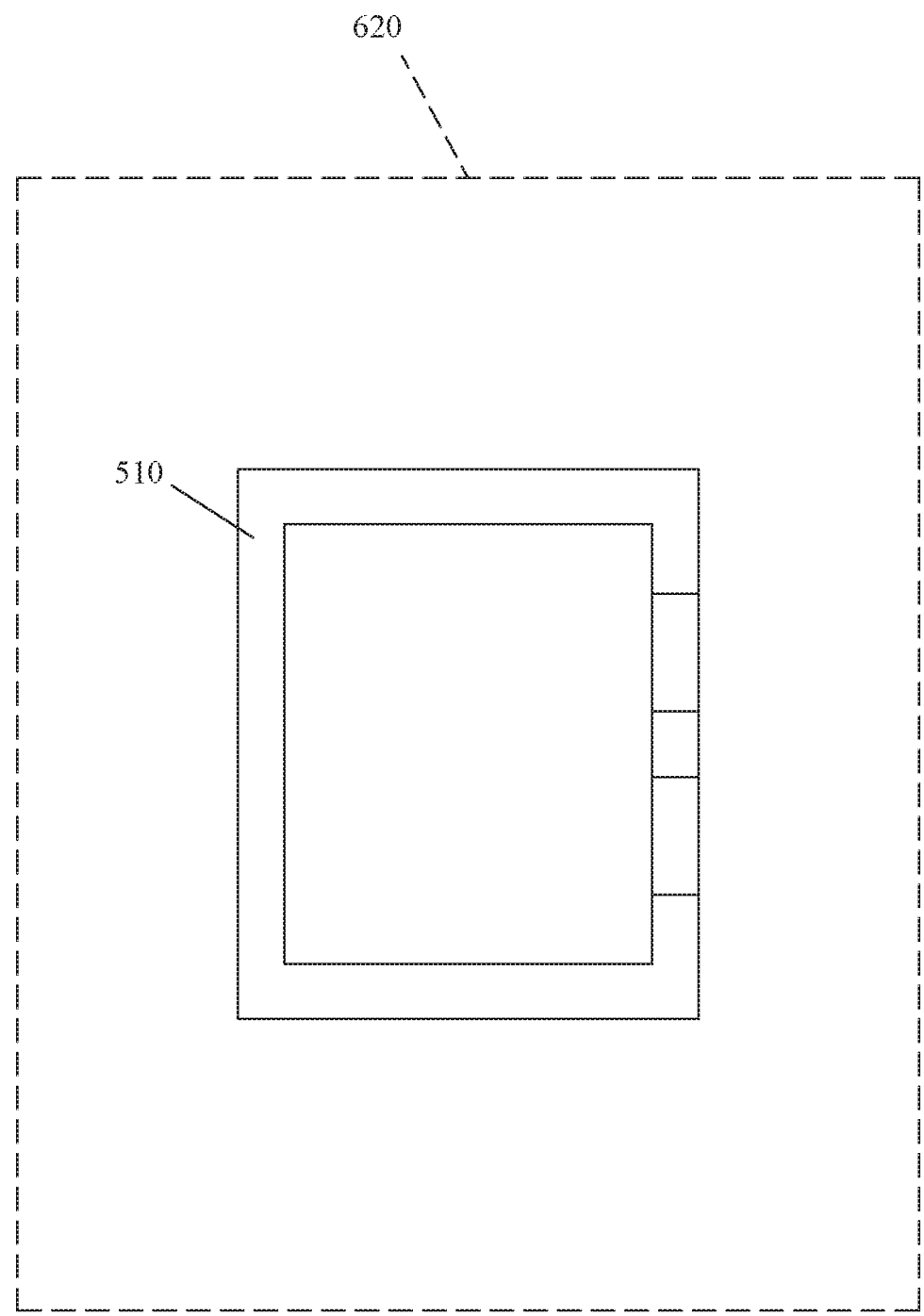
FIG. 8B is a schematic diagram of the presentation state of the object to be detected after performing the posture detection, adjusting the posture of the object to be detected, and moving the object to be detected to the surface detection position according to the object appearance detection system with posture detection of the present invention.

If the posture detection is not performed to calculate the offset and the rotation amount of the object to be detected 510, the object to be detected 510 is moved to the surface detection position 620 as shown in FIG. 8A, which is a schematic diagram of the presentation state of an object to be detected which is moved to the surface detection position without performing posture detection and adjusting the posture according to the object appearance detection system with posture detection of the present invention. The controlling and computing device 410 controls the robotic arm 240 according to the offset and the rotation amount of the object to be detected 510 to move the object to be detected 510 from the posture detection position 610 to the surface detection position 620 as shown in FIG. 8B, which is a schematic diagram of the presentation state of the object to be detected after performing the posture detection, adjusting the posture of the object to be detected, and moving the object to be detected to the surface detection position according to the object appearance detection system with posture detection of the present invention. A centric position of the object to be detected 510 is moved to a centric position of the surface detection position 620 according to the offset of the object to be detected 510, and the object to be detected 510 is rotated to be straightened according to the rotation amount of the object to be detected 510.

After the object to be detected 510 is moved to the surface detection position 620, the controlling and computing device 410 can obtain the back image of the object to be detected 510 from the remote imaging device 130 and obtain the front image, the left-side image, the right-side image, the top image, and the bottom image of the object to be detected 510 from the photographing devices 270 respectively.

The controlling and computing device 410 performs surface defect detection on the object to be detected 510 based on the back image, the front image, the left-side image, the right-side image, the top image, and the bottom image of the object to be detected 510.

After the controlling and computing device 410 obtains the back image, the front image, the left-side image, the right-side image, the top image, and the bottom image of the object to be detected 510, the controlling and computing device 410 can control the robotic arm 240 to move the object to be detected 510 from the surface detection position 620 and place the object to be detected 510 on the conveying production line 110. Then, the controlling and computing device 410 controls the conveying production line 110 to resume moving the object to be detected 510.

It is worth noting that the controlling and computing device 410 also establishes connections with the illumination devices 710 mentioned above. That is, the color and intensity of the light emitted by the illumination devices 710 can be controlled by the control and computing device 410. The color of the light emitted by the illumination devices 710 is one of red, green and blue.

Figure 9A:
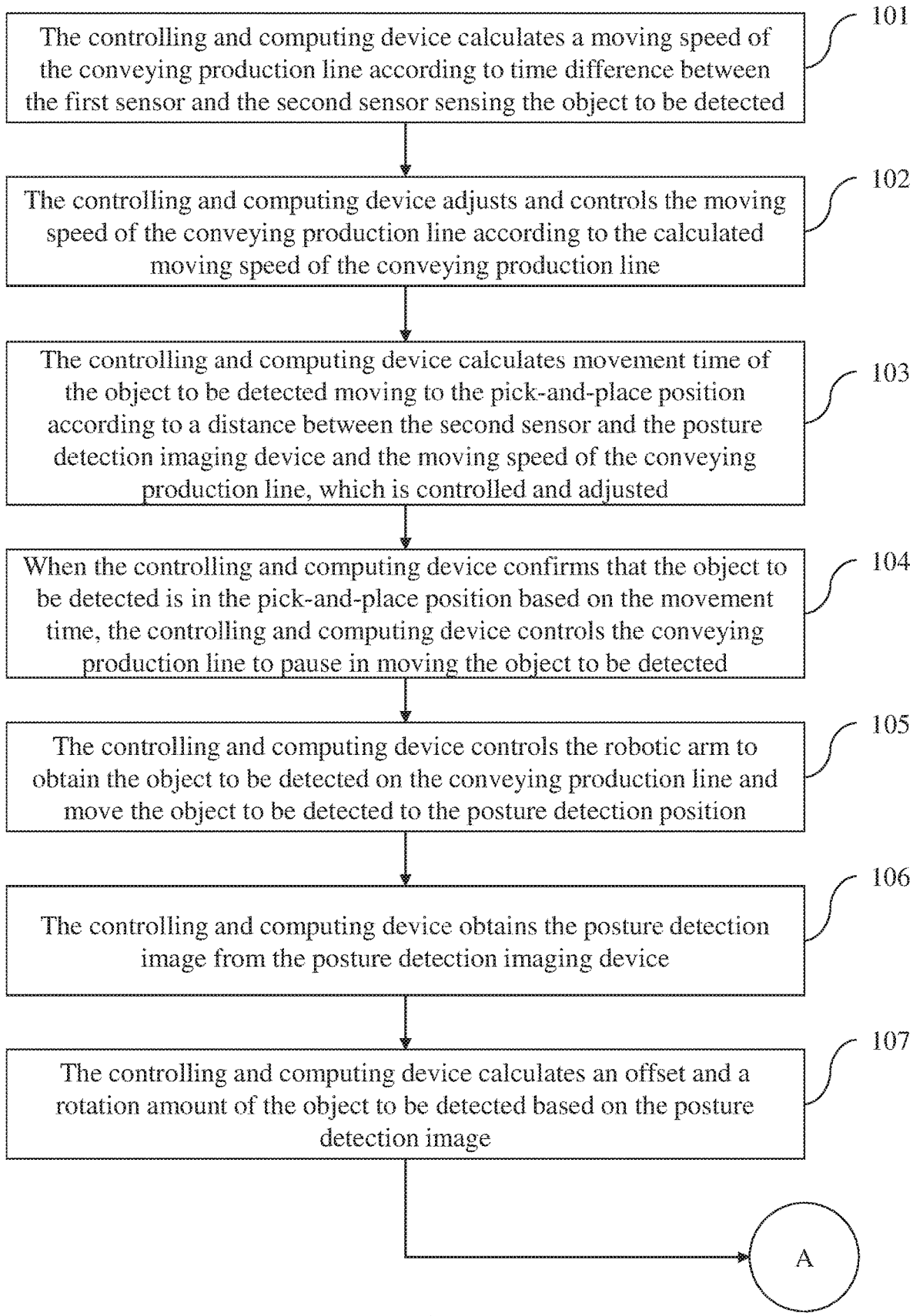
FIG. 9A and FIG. 9B are flowcharts illustrating a control method of the object appearance detection system with posture detection of the present invention.
Figure 9B:
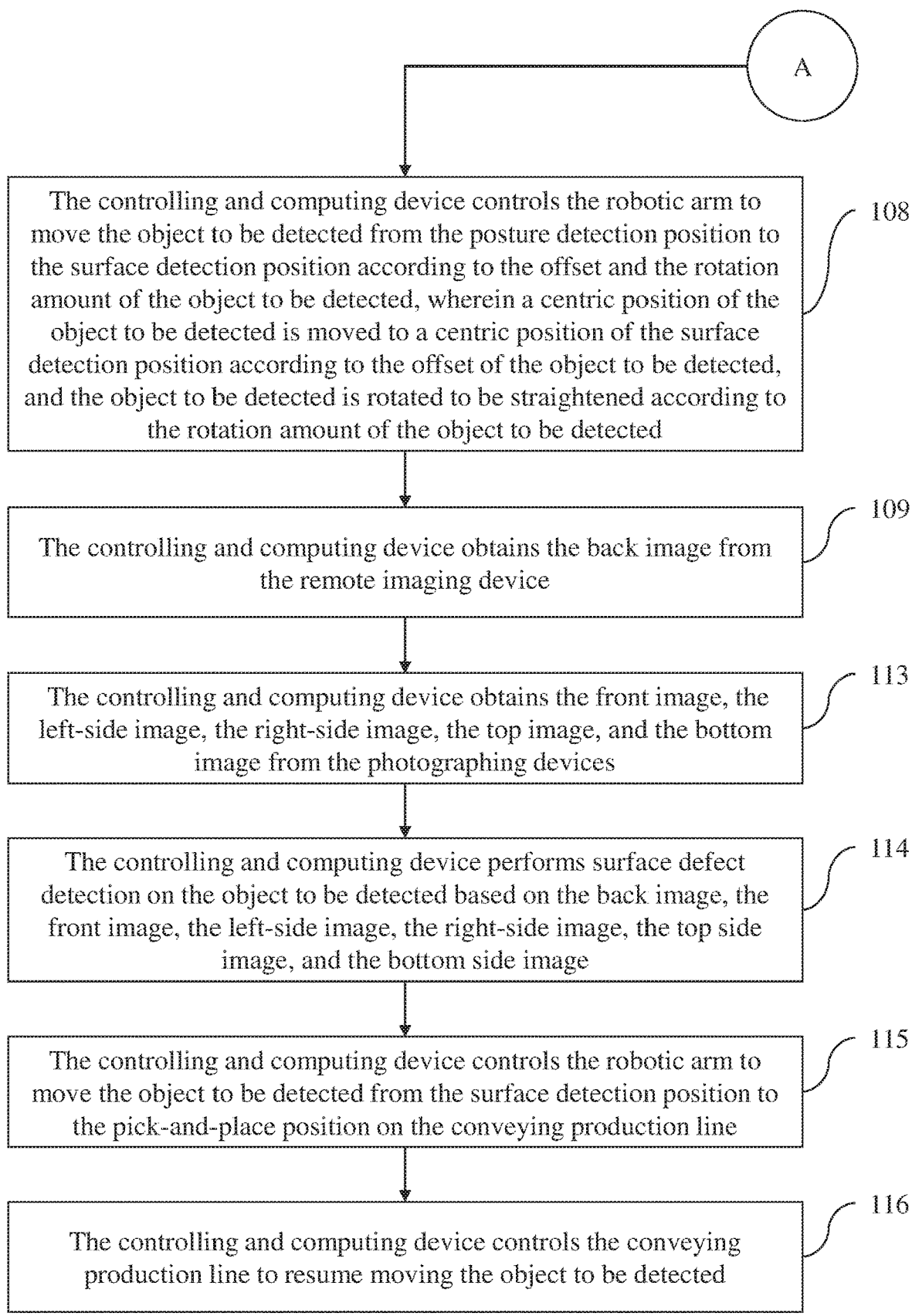

Please refer to FIG. 9A and FIG. 9B, wherein FIG. 9A and FIG. 9B are flowcharts illustrating a control method of the object appearance detection system with posture detection of the present invention.

First, the controlling and computing device calculates a moving speed of the conveying production line according to time difference between the first sensor and the second sensor sensing the object to be detected (step 101). Next, the controlling and computing device adjusts and controls the moving speed of the conveying production line according to the calculated moving speed of the conveying production line (step 102). Then, the controlling and computing device calculates movement time of the object to be detected moving to the pick-and-place position according to a distance between the second sensor and the posture detection imaging device and the moving speed of the conveying production line, which is controlled and adjusted (step 103). Then, when the controlling and computing device confirms that the object to be detected is in the pick-and-place position based on the movement time, the controlling and computing device controls the conveying production line to pause in moving the object to be detected (step 104). Then, the controlling and computing device controls the robotic arm to obtain the object to be detected on the conveying production line and move the object to be detected to the posture detection position (step 105). Then, the controlling and computing device obtains the posture detection image from the posture detection imaging device (step 106). Then, the controlling and computing device calculates an offset and a rotation amount of the object to be detected based on the posture detection image (step 107). Then, the controlling and computing device controls the robotic arm to move the object to be detected from the posture detection position to the surface detection position according to the offset and the rotation amount of the object to be detected, wherein a centric position of the object to be detected is moved to a centric position of the surface detection position according to the offset of the object to be detected, and the object to be detected is rotated to be straightened according to the rotation amount of the object to be detected (step 108). Then, the controlling and computing device obtains the back image from the remote imaging device (step 109). Then, the controlling and computing device obtains the front image, the left-side image, the right-side image, the top image, and the bottom image from the photographing devices (step 113). Then, the controlling and computing device performs surface defect detection on the object to be detected based on the back image, the front image, the left-side image, the right-side image, the top side image, and the bottom side image (step 114). Then, the controlling and computing device controls the robotic arm to move the object to be detected from the surface detection position to the pick-and-place position on the conveying production line (step 115). Finally, the controlling and computing device controls the conveying production line to resume moving the object to be detected (step 116).

In summary, it can be seen that the differences between the present invention and the prior art are that the controlling and computing device establishes connections with the conveying production line, the remote imaging device, the first sensor, the second sensor, the robotic arm, the posture detection imaging device, and the photographing devices respectively; the controlling and computing device uses the first sensor and the second sensor to control the conveying production line, and controls the operation of the robotic arm to move the object to be detected on the conveying production line to the posture detection position and the surface detection position respectively; when the object to be detected is in the posture detection position, the controlling and computing device receives the posture detection image from the posture detection imaging device to perform posture detection on the object to be detected; and when the object to be detected is in the surface detection position, the controlling and computing device controls the robotic arm to adjust the posture of the object to be detected according to the posture detection result and receives images from the remote imaging device and the photographing devices to perform surface defect detection on the object to be detected.

By the above-mentioned technical solution, the present invention can solve the problem that in the existing process of the automatic surface defect detection of the product, the posture detection is not performed to adjust the posture of the product, resulting in failure to obtain the surface images including full surfaces of the product, and the obtained the surface image may be an incorrect surface image due to the rotation of the product relative to the surface detection position, thereby causing a flaw in the surface defect detection, and achieve the technical effect of providing the posture detection and adjusting the posture of the object to be detected for object appearance detection.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An object appearance detection system with posture detection, which is used for a conveying production line including an input end where an object to be detected enters the conveying production line and an output end where the object to be detected exits the conveying production line, comprising:
    a first fixing frame disposed on the output end;
    a remote imaging device disposed on the first fixing frame and configured to capture a back image of the object to be detected in a surface detection position;
    a detection platform having a first installation surface and a second installation surface, the first installation surface being in contact with and perpendicular to the second installation surface, the second installation surface facing the conveying production line;
    a first sensor disposed adjacent to the input end, located on an edge of the first installation surface adjacent to the conveying production line, and configured to sense the object to be detected on the conveying production line;
    a second sensor spaced apart from the first sensor, disposed adjacent to the input end, located on the edge of the first installation surface adjacent to the conveying production line, and configured to sense the object to be detected on the conveying production line;
    a robotic arm disposed adjacent to the output end, located on the first installation surface, close to the conveying production line, and configured to obtain the object to be detected on the conveying production line to move the object to be detected to a posture detection position and to move and straighten the object to be detected to a surface detection position according to a posture detection result;
    a posture detection imaging device disposed adjacent to the output end, located on an edge of the second installation surface close to the conveying production line, and configured to capture a posture detection image of the object to be detected when the robotic arm moves the object to be detected to the posture detection position;
    a posture detection board disposed vertically above the posture detection imaging device, and used for posture detection of the object to be detected;
    a second fixing frame disposed on the first installation surface;
    a plurality of photographing devices disposed on the second fixing frame respectively, and configured to capture a front image, a left-side image, a right-side image, a top image and a bottom image of the object to be detected in the surface detection position respectively; and
    a controlling and computing device connecting to the conveying production line, the remote imaging device, the first sensor, the second sensor, the robotic arm, the posture detection imaging device, and the plurality of photographing devices, and configured to perform calculations on information received from the first sensor, the second sensor, and the posture detection imaging device to control operation of the conveying production line and the robotic arm, and to receive the back image, the front image, the left-side image, the right-side image, the top image and the bottom image of the object to be detected from the remote imaging device and the plurality of photographing devices to perform surface defect detection on the object to be detected.

2. The object appearance detection system with posture detection according to claim 1, wherein the robotic arm is a six-degree-of-freedom robotic arm.

3. The object appearance detection system with posture detection according to claim 1, wherein the object to be detected is a magnetic object.

4. The object appearance detection system with posture detection according to claim 3, wherein the robotic arm uses a magnetic fixture to obtain the object to be detected on the conveying production line by magnetic attraction.

5. The object appearance detection system with posture detection according to claim 1, wherein the object appearance detection system further comprises a plurality of illumination devices, and the plurality of illumination devices are disposed beside the remote imaging device on the first fixing frame and beside each of the plurality of photographing devices on the second fixing frame respectively.

6. The object appearance detection system with posture detection according to claim 5, wherein each of the plurality of illumination devices establishes a connection with the controlling and computing device, and a color and intensity of light emitted by the plurality of the illumination devices is controlled by the controlling and computing device.

7. The object appearance detection system with posture detection according to claim 6, wherein the color of the light emitted by the plurality of the illumination devices is controlled by the controlling and computing device to be one of red, green and blue.

8. A control method of the object appearance detection system with posture detection according to claim 1, which includes the following steps:
   calculating, by the controlling and computing device, a moving speed of the conveying production line according to a time difference between the first sensor and the second sensor sensing the object to be detected;
   controlling and adjusting, by the controlling and computing device, the moving speed of the conveying production line according to the calculated moving speed of the conveying production line;
   calculating, by the controlling and computing device, movement time of the object to be detected moving to a pick-and-place position according to a distance between the second sensor and the posture detection imaging device and the moving speed of the conveying production line, which is controlled and adjusted;
   when confirming, by the controlling and computing device, that the object to be detected is in the pick-and-place position based on the movement time, controlling, by the controlling and computing device, the conveying production line to pause in moving the object to be detected;
   controlling, by the controlling and computing device, the robotic arm to obtain the object to be detected on the conveying production line and to move the object to be detected to the posture detection position;
   obtaining, by the controlling and computing device, the posture detection image from the posture detection imaging device;
   calculating, by the controlling and computing device, an offset and a rotation amount of the object to be detected based on the posture detection image;
   controlling, by the controlling and computing device, the robotic arm to move the object to be detected from the posture detection position to the surface detection position according to the offset and the rotation amount of the object to be detected, wherein a centric position of the object to be detected is moved to a centric position of the surface detection position according to the offset of the object to be detected, and the object to be detected is rotated to be straightened according to the rotation amount of the object to be detected;
   obtaining, by the controlling and computing device, the back image from the remote imaging device;
   obtaining, by the controlling and computing device, the front image, the left-side image, the right-side image, the top image, and the bottom image from the plurality of photographing devices;
   performing surface defect detection, by the controlling and computing device, on the object to be detected based on the back image, the front image, the left-side image, the right-side image, the top side image, and the bottom side image;
   controlling, by the controlling and computing device, the robotic arm to move the object to be detected from the surface detection position to the pick-and-place position on the conveying production line; and
   controlling, by the controlling and computing device, the conveying production line to resume moving the object to be detected.

* * * * *